(12) United States Patent
Skillings

(10) Patent No.: US 12,682,321 B2
(45) Date of Patent: Jul. 14, 2026

(54) DISTRIBUTED MUSIC COLLABORATION

(71) Applicant: BANDLAB SINGAPORE PTE LTD, Singapore (SG)

(72) Inventor: Steve Skillings, Whitinsville, MA (US)

(73) Assignee: Bandlab Singapore PTE LTD, Singapore (SG)

( * ) Notice: Subject to any disclaimer, the term of this patent is extended or adjusted under 35 U.S.C. 154(b) by 558 days.

(21) Appl. No.: 18/101,325

(22) Filed: Jan. 25, 2023

(65) Prior Publication Data

US 2023/0164204 A1 May 25, 2023

Related U.S. Application Data

(63) Continuation of application No. 14/418,676, filed as application No. PCT/US2013/052860 on Jul. 31, 2013, now abandoned.

(Continued)

(51) Int. Cl.
*G06Q 10/101* (2023.01)
*G06F 16/61* (2019.01)
(Continued)

(52) U.S. Cl.
CPC .......... *G06Q 10/101* (2013.01); *G06F 16/61* (2019.01); *G06Q 10/06* (2013.01); *H04L 65/403* (2013.01)

(58) Field of Classification Search
CPC .... G06Q 10/101; G06Q 10/06; G06Q 10/103; G06Q 10/0633; G06F 16/61;
(Continued)

(56) References Cited

U.S. PATENT DOCUMENTS

2002/0091455 A1 7/2002 Williams
2003/0059067 A1 3/2003 Shibata
(Continued)

FOREIGN PATENT DOCUMENTS

CN 1741004 A 3/2006
CN 101300567 A 11/2008

OTHER PUBLICATIONS

Quick Guide [online]. AudacityTeam.org, 2012. Archived at web.archive.org on Feb. 7, 2012. Retrieved on Dec. 9, 2025 from <url:https://web.archive.org/web/20120207211201/http://manual.audacityteam.org/man/Quick_Guide> (Year: 2012).*
(Continued)

*Primary Examiner* — Fan S Tsang
*Assistant Examiner* — Sean M Rinehart
(74) *Attorney, Agent, or Firm* — Leber IP Law; Faustino Lichauco

(57) ABSTRACT

A system for enabling collaboration between musicians includes a server configured to be connected to remote clients via a wide area network. The server is configured to receive session tracks associated with a session, each of the session tracks containing data representative of music created by a music source during the session, and to store those session tracks in a session database that includes a plurality of session data units. Each of the session data units includes session tracks for a session and session metadata associated with the session tracks. The server is further configured to receive instructions from a user to modify the session metadata, and to also provide data representative of the session tracks as modified by the session metadata.

18 Claims, 5 Drawing Sheets

Related U.S. Application Data

(60) Provisional application No. 61/678,401, filed on Aug. 1, 2012.

(51) Int. Cl.
  *G06Q 10/06* (2023.01)
  *H04L 65/403* (2022.01)

(58) Field of Classification Search
  CPC .......... G06F 16/683; G06F 16/93; G06F 3/16; H04L 65/403; H04L 67/01
  USPC ............................................. 700/94; 707/608
  See application file for complete search history.

(56) References Cited

U.S. PATENT DOCUMENTS

| | | | |
|---|---|---|---|
| 2003/0174648 A1 | 9/2003 | Wang et al. | |
| 2004/0054725 A1 | 3/2004 | Moller et al. | |
| 2005/0143974 A1 | 6/2005 | Joly | |
| 2006/0206580 A1* | 9/2006 | Johnson, III | H04N 21/8113 348/E7.071 |
| 2007/0028750 A1 | 2/2007 | Darcie et al. | |
| 2007/0191976 A1 | 8/2007 | Ruokangas et al. | |
| 2008/0066612 A1 | 3/2008 | Kaneko | |
| 2008/0190271 A1* | 8/2008 | Taub | G10H 1/0058 84/645 |
| 2008/0193100 A1* | 8/2008 | Baum | H04N 21/4825 386/281 |
| 2008/0294663 A1 | 11/2008 | Heinley et al. | |
| 2009/0019996 A1 | 1/2009 | Fujishima et al. | |
| 2009/0070420 A1 | 3/2009 | Quackenbush | |
| 2009/0106429 A1* | 4/2009 | Siegal | G11B 27/034 709/227 |
| 2009/0164902 A1 | 6/2009 | Cohen et al. | |
| 2010/0132536 A1 | 6/2010 | O'Dwyer | |
| 2011/0023688 A1 | 2/2011 | Daisy | |
| 2011/0030031 A1* | 2/2011 | Lussier | G11B 27/34 709/219 |
| 2011/0081024 A1 | 4/2011 | Soulodre | |
| 2011/0082855 A1 | 4/2011 | Al-Omari et al. | |
| 2012/0017150 A1* | 1/2012 | Pollack | H04N 5/76 386/280 |
| 2012/0096371 A1 | 4/2012 | D'Anna | |
| 2012/0114309 A1* | 5/2012 | Gill | G06Q 30/0603 386/281 |
| 2013/0004138 A1 | 1/2013 | Kilar et al. | |
| 2013/0139057 A1 | 5/2013 | Vlassopulos | |
| 2013/0239036 A1 | 9/2013 | MacDonald | |
| 2013/0346413 A1* | 12/2013 | Moncavage | G06F 3/0482 707/740 |
| 2014/0310623 A1 | 10/2014 | O'Connell, Jr. et al. | |

OTHER PUBLICATIONS

"Lightspeed Audio Labs Launches Beta Release of Industry-Changing Music-based Social Networking Site | Business Wire Authors: Anonymous".

"LightSpeed Audio Labs Technology Authors: Anonymous".

Wikipedia. "Filesystem permissions". Jun. 22, 2012 snapshot taken via archive.org. URL Link: https://en.wikipedia.org/wiki/ File_system_permissions. Accessed Jun. 2018. (Year: 2012).

Wikipedia. "Multitrack recording". May 24, 2012 snapshot taken via archive.org. URL Link: https://en.wikipedia.org/wiki/Multitrack_recording. Accessed Jun. 2018. (Year: 2012).

Wikipedia. "Vector space". Jun. 11, 2012 snapshot taken via archive.org. URL Link: https://en.wikipedia.org/wikiNector_space. Accessed Jun. 2018. (Year: 2012).

* cited by examiner

DISTRIBUTED MUSIC COLLABORATION

CROSS REFERENCE TO RELATED APPLICATION

This application is continuation of U.S. application Ser. No. 14/418,676, filed Jan. 30, 2015, which is a 371 US national stage application of International Application No. PCT/US2013/052860, filed Jul. 31, 2013, which claims priority to U.S. Provisional Application No. 61/678,401 filed on Aug. 1, 2012, the contents of which are hereby incorporated by reference in their entirety.

FIELD OF DISCLOSURE

This disclosure relates to music processing software, and in particular to software for collaboration among musicians.

BACKGROUND

Data representative of music has long been editable on a computer. Music editors for this function are capable of starting with raw files and processing them to create various mixes. However, contemporary systems for carrying out this function do not facilitate collaboration among musicians.

SUMMARY

In one aspect, the invention features a system for enabling collaboration between musicians. Such a system includes a server configured to be connected to remote clients via a wide area network. The server is configured to receive session tracks associated with a session, each of the session tracks containing data representative of music created by a music source during the session, and to store those session tracks in a session database that includes a plurality of session data units. Each of the session data units includes session tracks for a session and session metadata associated with the session tracks. The server is further configured to receive instructions from a user to modify the session metadata, and to also provide data representative of the session tracks as modified by the session metadata.

Various kinds of metadata are contemplated to be within the scope of the invention. In some embodiments, the session metadata comprises a session transform, whereas in others, the session metadata comprises annotation data.

Some embodiments include features for permitting collaboration. For example, in some embodiments, the server is further configured to enable a first user to provide access to selected session tracks and the session metadata to a second user. In others, the server is further configured to enable a first user to permit a second user to annotate session tracks. And in yet others, the server is further configured to enable a first user to permit a second user to listen to selected session tracks as modified by a selected session transform.

Components of the invention may span multiple political jurisdictions. In some embodiments, the server is outside United States territory and is controlled by a user within United States territory for the benefit of the user.

In another aspect the invention features an apparatus for enabling a user to mix tracks representative of music. Such an apparatus includes a data processing system configured to receive session tracks associated with a session, each of the session tracks containing data representative of music created by a music source during the session, to store the session tracks in a session database, the session database including a plurality of session data units, each of the session data units including session tracks for a session and session metadata associated with the session tracks, wherein the server is further configured to receive instructions from a user to modify the session metadata, and wherein the server is configured to provide data representative of the session tracks as modified by the session metadata.

In some embodiments, the session metadata includes a session transform.

In the embodiments, the session metadata includes annotation data.

These and other features of the invention will be apparent from the following detailed description and the accompanying figures, in which:

DETAILED DESCRIPTION

Figure 1:
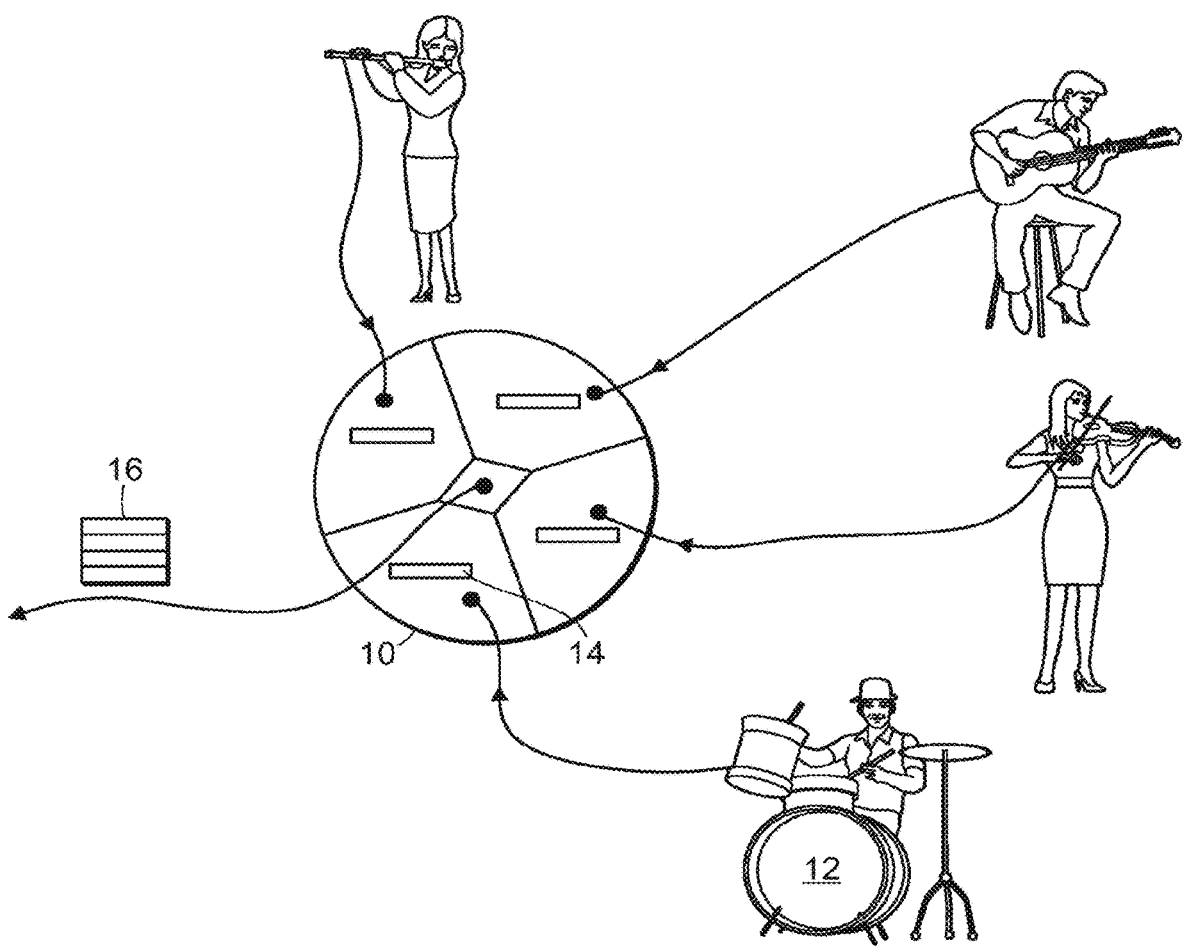
FIG. 1 shows a session hub with its output session vector.

Groups of musicians often come together to rehearse at a "session." A session hub 10, shown in FIG. 1 and described in U.S. Patent Publ. 2009/0282967, the contents of which are herein incorporated by reference, accepts input from a musician 12 and generates one or more tracks 14 corresponding to what that musician played during a session. Each of these tracks 14 is referred to herein as a "session track." In a typical session, there will be multiple session tracks 14.

The set of session tracks 14 concurrently obtained during a particular session defines a "session vector 16." The number of elements in the session vector 16 is greater than or equal to the number of musicians. Each session vector 16 contains data representative of music played by one or more of of the musicians.

Figure 2:
FIG. 2 shows a collaboration system to which the session hub of FIG. 1 is connected.

Referring now to FIG. 2, a distributed music collaboration system 18 features a server 20 remotely connected to the session hub 10 via a wide area network 22. The server 20 receives session vectors 16 from the session hub 10 and creates session data 24 that includes, in addition to the session vectors 16, session metadata 26. The session metadata 26 includes server-generated metadata 28 and user-generated metadata 30.

Server-generated metadata 28 includes the date and time of the session, and if available, the identities of the musicians participating in the session. User-generated metadata 30 is provided by one or more users 32 accessing the collaboration system 18 using one of a corresponding plurality of clients 34. Such a user 32 generally maintains an account with the collaboration system 18. Through such an account, the user 32 can access session data 24 and create, alter, inspect or otherwise manipulate user-generated metadata 30.

One way for a user 32 to create user-generated metadata 30 is to perform custom editing or mixing of the session vectors 16. For example, a user 32 may want to alter relative volumes of session tracks 14, either in their entirety or within selected sections. Or the user 32 may want to alter the underlying time base either entirely or in sections, thus manipulating the tempo of the music. Or a user 32 may wish to cut and paste selected portions of session tracks 14.

Rather than alter the underlying session vector 16, the user's various editing and mixing commands are saved as a session transform 38. A filtering streamer 40 accepts a session transform 38 and a session vector 16 as inputs and outputs audio that can be listened to at a user's client 34.

A user 32 who wishes to hear the music as it was recorded during the session causes the filtering streamer 40 to accept that session vector 16 as a first input, and uses an identity session transform 38 as a second input. This results in the original music being streamed to the client 34. On the other hand, a user 32 who wishes to hear the result of his own editing and mixing or that carried out by another, specifies the session vector 16 as a first input and a particular session transform 38 as the second input. This causes the filtering streamer 40 to stream, to the client 34, the music from that session as modified by the selected session transform 38.

A user 32 can create several different session transforms 38 corresponding to different mixes. In doing so, the session vector 16 serves as a common foundation for all the different mixes. In addition, a user 32 can authorize other users to listen to the session vector 16 as modified by any session transform 38 by, for example, sending a link either to the session transform 38 or to a filtering streamer 40 having the appropriate session vector 16 and session transform 38 as inputs.

In addition to session transforms 38, session metadata 26 can also include annotations 42 linked to specified time points or time intervals in one or more session tracks 14 of a session vector 16. A user 32 on one client 34 can thus make comments pertaining to a particular session track 14 or portion thereof. These comments are saved as user-generated metadata 30 available to a user's collaborator. The collaborator may then add his own comments either in response to the user's comments or pertaining to another session track 14 or portion thereof.

The collaboration system 18 described herein thus permits a musician to collaborate with other musicians in connection with a session and to do so without creating multiple edited copies of the session data 24.

Figure 3:
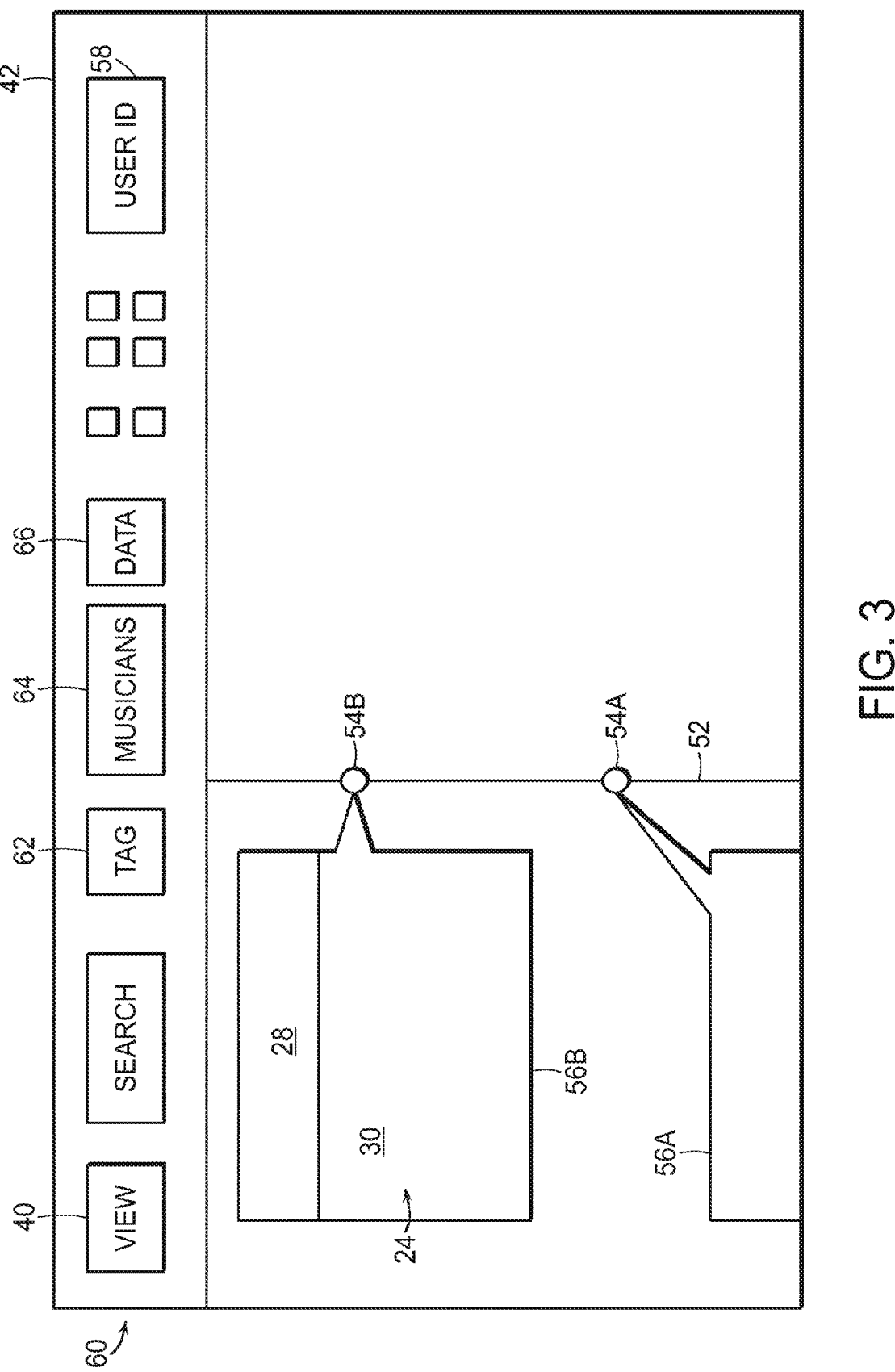
FIG. 3 shows a time-line view of a user-interface for the collaboration system of FIG. 2.

A representative user-interface encountered by a user 32 who accesses a server hosting the collaborative music system 18 is shown in FIG. 3. The user-interface includes a view button 40 that allows the user 32 to switch between different views. These views include a time-line view 42, shown in FIG. 3, an annotation view 44, shown in FIG. 4, a mixing view 46, shown in FIG. 5, an editing view 48, shown in FIG. 6, and a human-readable music view 50, shown in FIG. 7.

The time-line view 42, shown in FIG. 3, features a scrollable time-line 52 having nodes 54A-54B corresponding to each session that the user 32 is authorized to access. These nodes 54A, 54B are ordered by the time at which the session occurred. Each node 54A-54B is associated with a metadata field 56A, 56B showing the metadata 24 associated with that session. A metadata field 56A in some embodiments appears when a user 32 clicks on or hovers over its corresponding node 54A. The user's identity is identified in a user-ID field 58 at the top of the time-line view 42. A top row 60 of the time-line view 42, as well as the other views, features three buttons that reveal corresponding metadata for a currently selected session. These buttons include a first button 64 for accessing a list of musicians associated with the session, a second button 62 for accessing user-generated metadata, and a third button 66 for accessing server-generated metadata.

Clicking the first button 64 causes display of a window that shows musicians associated with the session and invites the user 32 to modify the information. Information concerning musicians can be tied to an account associated with the musician. However, this need not be the case.

Clicking the second button 62 causes display of a window that shows tags associated with the selected session and invites the user 32 to edit or add searchable information about the session. For example, the user 32 may enter information identifying the genre, or the key, or the names and/or composers of songs rehearsed during the session.

Clicking the third button 66 causes display of a window that shows date and time stamps, file size, and similar server-generated data that is also user searchable.

Figure 4:
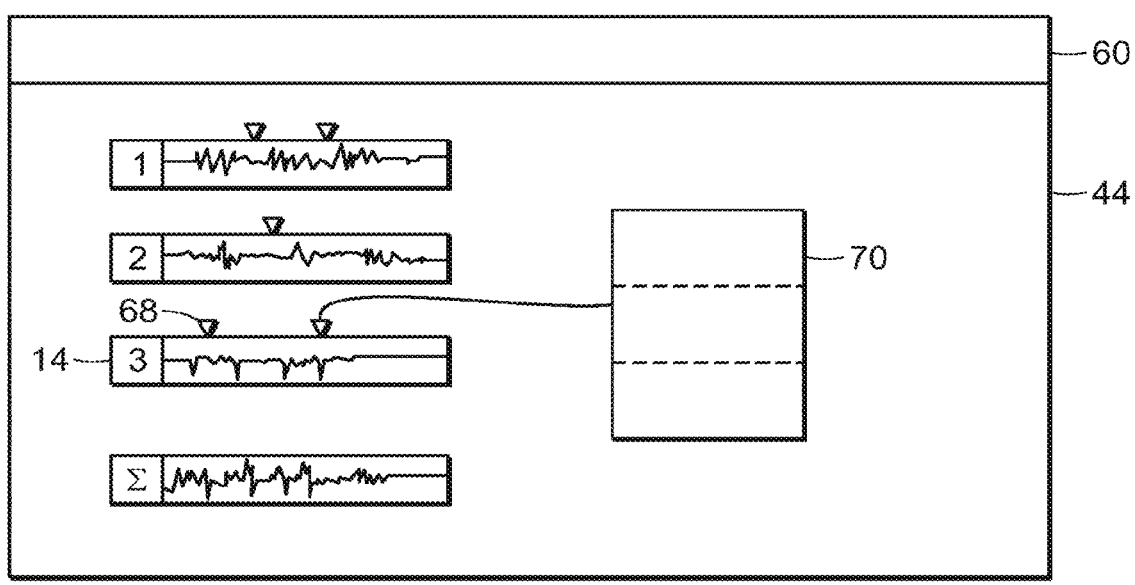
FIG. 4 shows an annotation view of a user-interface for the collaboration system of FIG. 2.

The annotation view 44, shown in FIG. 4, provides features to facilitate collaboration with other users. In the annotation view 44, a portion of the window shows session tracks 14, or combinations thereof, in graphical form. The user 32 can introduce marker points 68 to mark selected points in one or more session tracks 14. In the illustrated interface, these marker points 68 are triangles having a vertex resting on the graphical representation of the session track 14. The location of the marker point 68 indicates the time relative to some fixed point in the session track 14, which is usually the beginning of the session track 14.

Associated with each marker point 68 is an annotation window 70 in which the user 32 can enter his observations about the session track 14, both for himself and to share with other users. Upon clicking on a marker point 68, the annotation window 70 opens and reveals any comments either by the user or by his collaborators. In some embodiments, the annotation window 70 has different colors corresponding to different collaborating users.

A useful feature in certain embodiments is a play-loop that enables a relevant portion of the session track 14 to be played so that a comment concerning that portion can be readily understood in its musical context.

Figure 5:
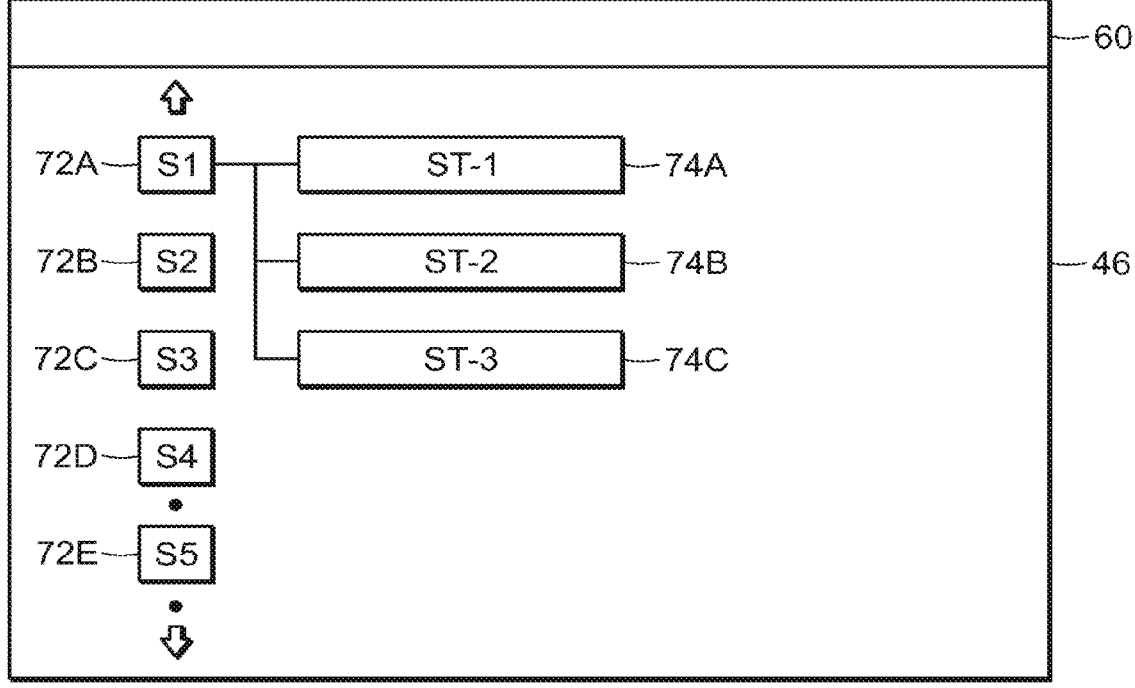
FIG. 5 shows a mixing view of a user-interface for the collaboration system of FIG. 2.

The mixing view 46, shown in FIG. 5, provides a way to see, for each of several sessions 72A-72E the various session transforms 74A-74C that have been saved by the user 32 or by his collaborators. In the particular example shown, three session transforms 74A-74C have been saved for the first session 72A. When the user 32 selects a session transform 74A, the server 20 passes the session tracks 14 and the selected session transform 74A to the filtering streamer 40 to be streamed to the user 32.

Figure 6:
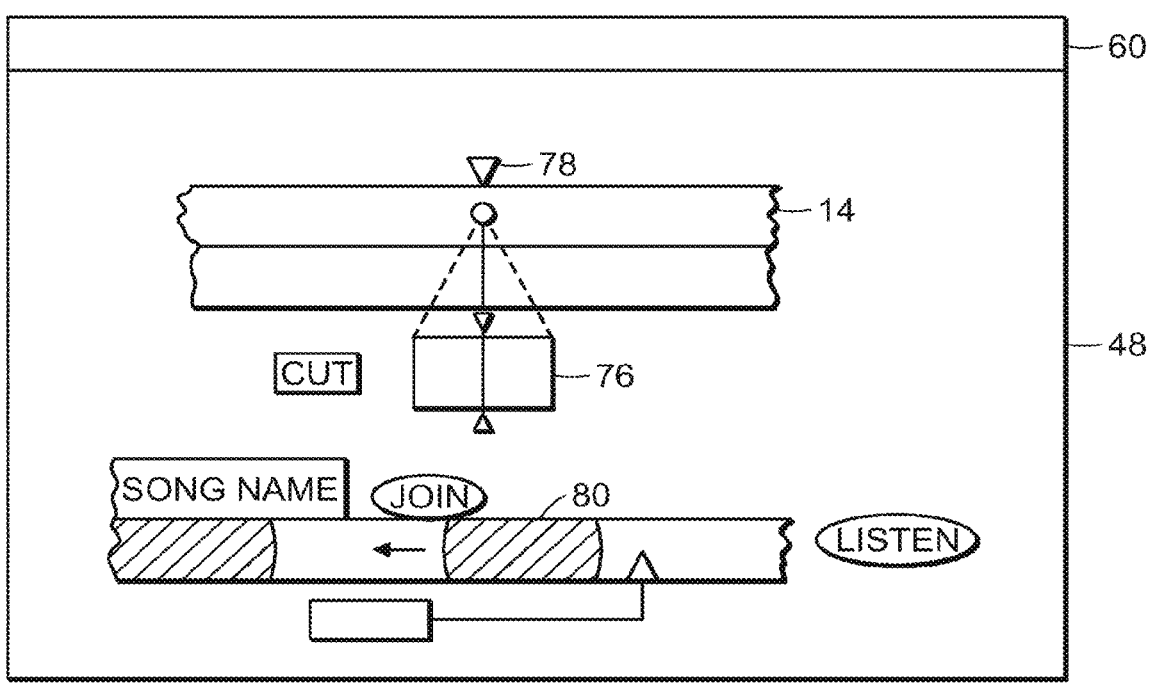
FIG. 6 shows an editing view of a user-interface for the collaboration system of FIG. 2.

The editing view 48, shown in FIG. 6, provides an interface to enable users to cut, copy, and paste selections 76 within and between session tracks 14, play, pause, fast forward, rewind, or otherwise position a play head 78, and change levels within a specified interval 80, either overall or for selected frequencies.

Figure 7:
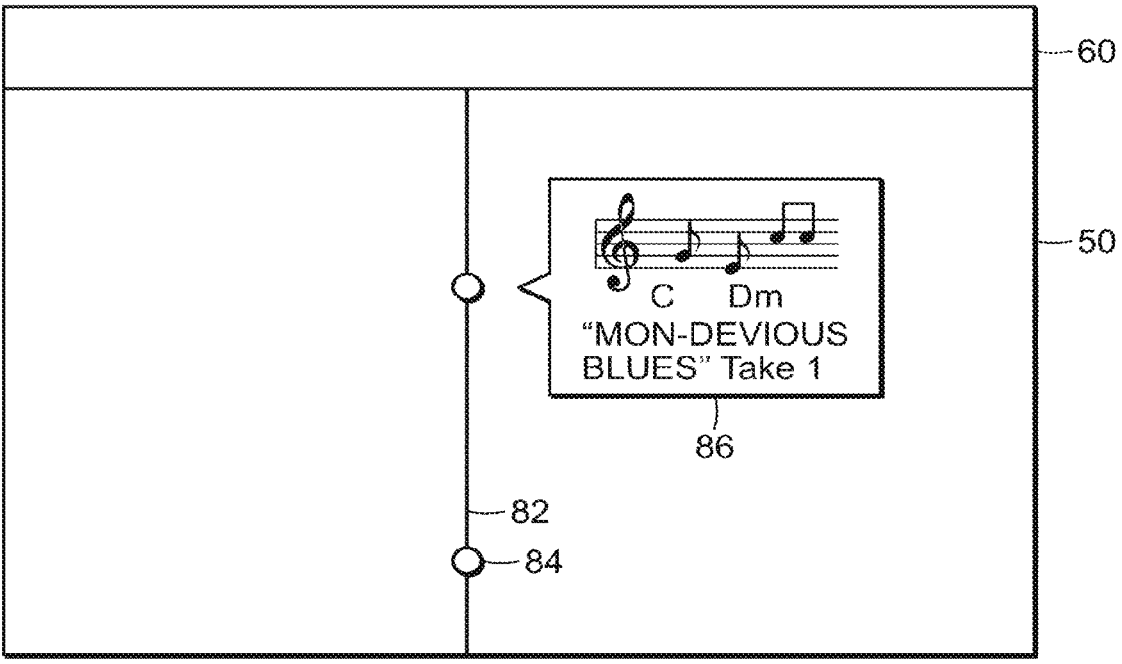
FIG. 7 shows a music view of a user-interface for the collaboration system of FIG. 2.

The music view 50, shown in FIG. 7, includes a scrollable-time-line 82 similar to that shown in the time-line view 42 in which each node 84 corresponds to a session track 14. In this view, clicking on a node 84 causes display of a window 86 showing a title, lyrics, notes, or chords associated with the session track 14.

The principles described herein, and the advantages thereof, are also applicable to the case in which no network is contemplated. For example, when implemented on a stand-alone system, such as a personal computer, a user can experiment with different mixes on the fly in the same manner described above by applying user-generated metadata to existing session data.

Having described the invention and a preferred embodiment thereof, what I claim as new and secured by Letters Patent is:

1. An apparatus comprising a collaboration system that comprises a session hub and a server that is in data communication with said session hub and that is also in data communication, via a wide-area network, with a plurality of clients, among which are first and second clients that are used by corresponding first and second users, wherein said server comprises a filtering streamer, a first session transform, a second session transform, and a session vector that comprises session tracks that were provided to said server by said session hub, wherein each of said session tracks represents music that was played by a corresponding one of a plurality of musicians during a session, wherein said session vector has at least as many elements as musicians in said plurality of musicians, wherein said first and second session transforms comprise user-defined editing and mixing commands that were received from said first and second clients, respectively, wherein said filtering streamer is configured to receive said session vector as a first input thereof and to use said session vector as a common foundation for plural mixes by accepting said first session transform as a second input, streaming a first mix to said second client, whereby said filtering streamer accepts said first session transform and said session vector as inputs and outputs audio that can be listened to at said first client, thereby causing said filtering streamer to stream said first mix to said first client, said first mix comprising music from said session as modified by said first session transform, accepting said second session transform as a second input, and streaming a second mix to said first client, whereby said filtering streamer accepts said second session transform and said session vector as inputs and outputs audio that can be listened to at said second client, thereby causing said filtering streamer to stream said second mix to said second client, said second mix comprising music from said session as modified by said second session transform, wherein said first mix comprises said session vector as modified by said first session transform and wherein said second mix comprises said session vector as modified by said second session transform, wherein said server is configured to provide said first user with a user interface having a plurality of views and an interface element that permits switching between views in said plurality of views, wherein said views in said plurality of views comprise a time-line view, an annotation view, a mixing view, an editing view, and a human-readable music view, wherein said time-line view comprises a scrollable time-line having nodes corresponding to each session that said first user is authorized to access, wherein said nodes are ordered by times within said session, wherein each node is associated with a metadata field that shows said metadata associated with said session, wherein said annotation view displays session tracks in graphical form and marker points to mark selected points in each of said session tracks, wherein each marker point has an associated annotation window in which said first user enters information to be shared with other users, wherein, opening said annotation window reveals comments entered by said first user and comments entered by other users, wherein said mixing view displays, for each of several sessions, session transforms that have been saved by said first user and session transforms that have been saved by other users, wherein said editing view provides an interface to enable users to cut, copy, and paste selections within and between session tracks, to play, pause, fast-forward, rewind, and to position a play head, and to change levels within a specified interval for selected frequencies, and wherein said music view includes a scrollable time-line that has nodes, wherein clicking on a node causes display of a window showing a title, lyrics, notes, and chords associated with said session track.

2. The apparatus of claim 1, wherein said wide-area network provides communication between said server and said session hub.

3. The apparatus of claim 1, wherein, in response to an instruction from said first client, said server provides said second client with a link to said first session transform and wherein, in response to an instruction from said second client, said server provides said first client with a link to said second session transform.

4. The apparatus of claim 1, wherein said server is further configured to send a link to said second client to permit said second user to stream said first mix and wherein said server is configured to send a link to said first client to permit said first user to stream said second mix.

5. The apparatus of claim 1, wherein said server is configured to permit said first user to send a link to said second user, wherein said link leads to all session transforms prepared by said first user.

6. The apparatus of claim 1, wherein said server is configured to permit said first user to send a link to said second user, said link leading to said filtering streamer, said filtering streamer having been prepared to stream said first mix by having been provided with said session vector and said first session transform as inputs.

7. The apparatus of claim 1, wherein said server is further configured to enable said first user to provide access to selected session tracks and session metadata to said second user.

8. The apparatus of claim 1, wherein said server is further configured to enable said first user to permit said second user to annotate said session tracks.

9. The apparatus of claim 1, wherein said server is configured to provide a view of said first and second session transforms and, in response to a selection of one of said session transforms, to provide said selected session transform to said filtering streamer for enabling said filtering streamer to stream audio to said second user.

10. The apparatus of claim 1, wherein said server is further configured to provide an identity session transform as a second input to said filtering streamer and to cause said filtering streamer to stream a third mix, said third mix being said session vector as originally recorded.

11. A method comprising, at a server that is connected to first and second clients via a network, receiving, from a session hub, session tracks, each of said session tracks representing music that was played by a corresponding one of a plurality of musicians during a session, forming a session vector from said session tracks, said session vector having at least as many elements as musicians in said plurality of musicians, receiving, from said first client, a first session transform, said first session transform comprising editing and mixing commands provided by a first user, receiving, from said second client, a second session transform, said second session transform comprising editing and mixing commands provided by a second user, providing said session vector as a first input to a filtering streamer, providing said first session transform as a second input to said filtering streamer, using said filtering streamer, streaming first audio to said second client, said first audio comprising said session vector after having been modified by said first session transform, whereby said filtering streamer accepts said first session transform and said session vector as inputs and outputs audio that can be listened to at said first client, thereby causing said filtering streamer to stream said first mix to said first client, said first mix comprising music from said session as modified by said first session transform, providing said second session transform as a second input to said filtering streamer, and using said filtering streamer, streaming second audio to said first client, said second audio comprising said session vector after having been modified by said second session transform, whereby said filtering streamer accepts said second session transform and said session vector as inputs and outputs audio that can be listened to at said second client, thereby causing said filtering streamer to stream said second mix to said second client, said second mix comprising music from said session as modified by said second session transform, said method further comprising providing said first user with a user interface having a plurality of views and an interface element that permits switching between views in said plurality of views, wherein said views in said plurality of views comprise a time-line view, an annotation view, a mixing view, an editing view, and a human-readable music view, wherein said time-line view comprises a scrollable time-line having nodes corresponding to each session that said first user is authorized to access, wherein said nodes are ordered by times within said session, wherein each node is associated with a metadata field that shows said metadata associated with said session, wherein said annotation view displays session tracks in graphical form and marker points to mark selected points in each of said session tracks, wherein each marker point has an associated annotation window in which said first user enters information to be shared with other users, wherein, opening said annotation window reveals comments entered by said first user and comments entered by other users, wherein said mixing view displays, for each of several sessions, session transforms that have been saved by said first user and session transforms that have been saved by other users, wherein said editing view provides an interface to enable users to cut, copy, and paste selections within and between session tracks, to play, pause, fast-forward, rewind, and to position a play head, and to change levels within a specified interval for selected frequencies, and wherein said music view includes a scrollable time-line that has nodes, wherein clicking on a node causes display of a window showing a title, lyrics, notes, and chords associated with said session track.

12. The method of claim 11, further comprising establishing a connection between said server and said session hub via said network.

13. The method of claim 11, further comprising said server responding to a first instruction by providing said second client with a link to said first session transform and responding to a second instruction by providing said first client with a link to said second session transform, wherein said first instruction was provided by said first client and said second instruction was provided by said second client.

14. The method of claim 11, further comprising causing said server to send a first link via said network and causing said server to send a second link via said network, wherein causing said server to send said first link comprises causing said server to send said first link to said second client to permit said second user to stream said first mix and wherein causing said server to send said second link comprises causing said server to send said second link to said first client to permit said first user to stream said second mix.

15. The method of claim 11, further comprising causing said server to permit said first client to send a link to said second client, wherein said link leads to all session transforms stored on said server that were prepared by said first user, thereby enabling said second user to cause said filtering streamer to provide a plurality of mixes to said second user, wherein each mix in said plurality of mixes is a result of said session vector having been modified by a corresponding one of said session transforms that are both stored on said server and prepared by said first user.

16. The method of claim 11, further comprising preparing said filtering streamer to stream said first mix and causing said server to permit said first user to send a link to said second user, wherein said link is a link that leads to said filtering streamer, wherein preparing said filtering streamer to stream said first mix comprises providing said filtering streamer with said session vector as a first input and providing said filtering streamer with said first session transform as a second input.

17. The method of claim 11, further comprising, in response to a receiving an instruction from said first user, permitting said second user to annotate said session tracks.

18. The method of claim 11, further comprising said server enabling said user to provide access to selected session tracks and session metadata to said second user.

* * * * *